(12) United States Patent
Hannuksela et al.

(10) Patent No.: US 8,908,770 B2
(45) Date of Patent: Dec. 9, 2014

(54) CARRIAGE OF SEI MESSAGES IN RTP PAYLOAD FORMAT

(71) Applicant: Nokia Corporation, Espoo (FI)

(72) Inventors: Miska Hannuksela, Ruutana (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/735,615

(22) Filed: Jan. 7, 2013

(65) Prior Publication Data

US 2013/0121413 A1 May 16, 2013

Related U.S. Application Data

(62) Division of application No. 12/016,155, filed on Jan. 17, 2008, now Pat. No. 8,355,448.

(60) Provisional application No. 60/885,606, filed on Jan. 18, 2007.

(51) Int. Cl.
| | |
|---|---|
| H04N 7/12 | (2006.01) |
| H04N 19/503 | (2014.01) |
| H04N 21/845 | (2011.01) |
| H04N 19/61 | (2014.01) |
| H04N 21/2381 | (2011.01) |
| H04N 21/2343 | (2011.01) |
| H04N 21/6437 | (2011.01) |

(52) U.S. Cl.
CPC ..... *H04N 19/00575* (2013.01); *H04N 21/8451* (2013.01); *H04N 19/00781* (2013.01); *H04N 21/2381* (2013.01); *H04N 21/234327* (2013.01); *H04N 21/6437* (2013.01)
USPC ..................... 375/240.24; 370/352

(58) Field of Classification Search
CPC .............. H04B 1/66; H04N 19/00575; H04N 19/00321; H04N 19/00533; H04N 19/00545; H04N 19/00551
USPC ......... 370/356, 352, 329, 485–487; 375/240.24, 316, 324, 240.19, 240.11, 375/240.15, 240.01, 240.08, 240.26; 382/233, 236, 238, 240, 299
See application file for complete search history.

(56) References Cited

U.S. PATENT DOCUMENTS

| | | | |
|---|---|---|---|
| 6,680,976 | B1 | 1/2004 | Chen et al. |
| 6,862,278 | B1 | 3/2005 | Chang et al. |

(Continued)

FOREIGN PATENT DOCUMENTS

| | | | |
|---|---|---|---|
| JP | 2005 203950 A | | 7/2005 |
| KR | 2007-7028 A1 | | 1/2007 |

(Continued)

OTHER PUBLICATIONS

International Search Report for Application No. PCT/IB2008/050174.

(Continued)

*Primary Examiner* — Hanh N Nguyen

(74) *Attorney, Agent, or Firm* — Alston & Bird LLP

(57) ABSTRACT

A system and method of modifying error resiliency features by conveying temporal level 0 picture indices, such as t10_pic_idx, within an SEI message instead of optionally including them in the NAL unit header is provided. In addition, a mechanism is provided for enabling repetition of any SEI messages in Real-Time Transport Protocol (RTP) packets. Enabling such repetition of any SEI messages facilitates detection of lost temporal level 0 pictures on the basis of any received packet.

22 Claims, 4 Drawing Sheets

(56) References Cited

U.S. PATENT DOCUMENTS

| | | | |
|---|---|---|---|
| 7,039,113 B2 | 5/2006 | Soundararajan | |
| 7,869,501 B2 * | 1/2011 | Park et al. | 375/240.01 |
| 7,899,113 B2 | 3/2011 | Gomila et al. | |
| 8,355,448 B2 * | 1/2013 | Hannuksela et al. | 375/240.24 |
| 8,619,868 B2 * | 12/2013 | Hannuksela et al. | 375/240.25 |
| 2005/0008240 A1 | 1/2005 | Banerji et al. | |
| 2005/0254575 A1 | 11/2005 | Hannuksela et al. | |
| 2006/0114990 A1 * | 6/2006 | Pak | 375/240.03 |
| 2006/0223461 A1 | 10/2006 | Laroia et al. | |
| 2007/0014346 A1 | 1/2007 | Wang et al. | |
| 2007/0201549 A1 | 8/2007 | Hannuksela et al. | |
| 2007/0206673 A1 * | 9/2007 | Cipolli et al. | 375/240.1 |
| 2007/0230564 A1 * | 10/2007 | Chen et al. | 375/240.01 |
| 2008/0205511 A1 * | 8/2008 | Hannuksela et al. | 375/240.01 |
| 2008/0298470 A1 | 12/2008 | Boyce et al. | |
| 2012/0027316 A1 * | 2/2012 | Wang et al. | 382/239 |
| 2013/0107954 A1 * | 5/2013 | Hannuksela et al. | 375/240.12 |

FOREIGN PATENT DOCUMENTS

| | | |
|---|---|---|
| RU | 2375839 C2 | 12/2009 |
| TW | 200427311 A | 12/2004 |
| TW | 200427333 A | 12/2004 |
| TW | 200428879 A | 12/2004 |
| TW | 200531555 A | 9/2005 |
| WO | WO 2005/106875 A2 | 11/2005 |
| WO | WO 2006/080910 A1 | 8/2006 |
| WO | WO 2006/108917 A1 | 10/2006 |
| WO | WO 2006/134110 A1 | 12/2006 |

OTHER PUBLICATIONS

Allowance in Russian Application No. 2009130914/09 dated Mar. 25, 2011.

Office Action for Canadian Application No. 2,675,955 dated Feb. 29, 2012.

Office Action for Korean Application No. 2009-7017111 dated Jan. 19, 2011.

Wang, T. et al., *Enhancement-layer IDR (EIDR) Picture*, Joint Video Team (JVT) of ISO/IEC MPEG & ITU-T VCEG, Oct. 2005, pp. 1-4.

Wenger et al., *RTP Payload Format for H.264 Video*, Aug. 2004, Network Working group, pp. 1-76.

JVT-U201, "Joint Draft 8 of SVC Amendment", 21st JVT meeting, HangZhou, China, Oct. 2006, available at ftp.itu.ch/av-arch/jvt-site/2006_10_Hangzhou/JVT-U201.zip.

JVT-U209, "Joint Draft 1.0 on Multiview Video Coding", 21st JVT meeting, HangZhou, China, Oct. 2006, available at ftp3.itu.ch/av-arch/jvt-site/2006_10_Hangzhou/JVT-U209.zip.

Office Action for Russian Application No. 2009130914/09)043216) dated Mar. 15, 2010.

Notice of Allowance for Korean Application No. 97101994 dated Jun. 24, 2014.

* cited by examiner

CARRIAGE OF SEI MESSAGES IN RTP PAYLOAD FORMAT

CROSS-REFERENCE TO RELATED APPLICATIONS

This application is a divisional application of U.S. Non-Provisional application Ser. No. 12/016,155, filed Jan. 17, 2008, entitled "Carriage Of SEI Messages In RTP Payload Format," which claims priority to U.S. Provisional Application No. 60/885,606, filed Jan. 18, 2007, entitled "Carriage Of SEI Messages In RTP Payload Format," both of which are incorporated herein by reference in their entireties.

FIELD OF THE INVENTION

The present invention relates generally to the field of scalable video coding. More particularly, the present invention relates to error resiliency in H.264/Advanced Video Coding (AVC) and Scalable Video Coding (SVC).

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also know as ISO/IEC MPEG-4 AVC). In addition, there are currently efforts underway with regards to the development of new video coding standards. One such standard under development is the SVC standard, which will become the scalable extension to H.264/AVC. Another standard under development is the multi-view coding standard (MVC), which is also an extension of H.264/AVC. Yet another such effort involves the development of China video coding standards.

The latest draft of the SVC is described in JVT-U201, "Joint Draft 8 of SVC Amendment", 21$^{st}$ JVT meeting, HangZhou, China, October 2006, available at ftp3.itu.ch/av-arch/jvt-site/2006_10_Hangzhou/JVT-U201.zip. The latest draft of MVC is in described in JVT-U209, "Joint Draft 1.0 on Multiview Video Coding", 21$^{st}$ JVT meeting, HangZhou, China, October 2006, available at ftp3.itu.ch/av-arch/jvt-site/2006_10_Hangzhou/JVT-U209.zip. Both of these documents are incorporated herein by reference in their entireties.

Scalable media is typically ordered into hierarchical layers of data. A base layer contains an individual representation of a coded media stream such as a video sequence. Enhancement layers contain refinement data relative to previous layers in the layer hierarchy. The quality of the decoded media stream progressively improves as enhancement layers are added to the base layer. An enhancement layer enhances the temporal resolution (i.e., the frame rate), the spatial resolution, or simply the quality of the video content represented by another layer or part thereof. Each layer, together with all of its dependent layers, is one representation of the video signal at a certain spatial resolution, temporal resolution and quality level. Therefore, the term "scalable layer representation" is used herein to describe a scalable layer together with all of its dependent layers. The portion of a scalable bitstream corresponding to a scalable layer representation can be extracted and decoded to produce a representation of the original signal at a certain fidelity.

The concept of a video coding layer (VCL) and network abstraction layer (NAL) is inherited from advanced video coding (AVC). The VCL contains the signal processing functionality of the codec; mechanisms such as transform, quantization, motion-compensated prediction, loop filter, inter-layer prediction. A coded picture of a base or enhancement layer consists of one or more slices. The NAL encapsulates each slice generated by the VCL into one or more NAL units. A NAL unit comprises a NAL unit header and a NAL unit payload. The NAL unit header includes the NAL unit type indicating whether the NAL unit contains a coded slice, a coded slice data partition, a sequence or picture parameter set, etc. A NAL unit stream is a concatenation of a number of NAL units. An encoded bitstream according to H.264/AVC or its extensions, e.g. SVC, is either a NAL unit stream or a byte stream by prefixing a start code to each NAL unit in a NAL unit stream.

Each SVC layer is formed by NAL units, representing the coded video bits of the layer. A Real Time Transport Protocol (RTP) stream carrying only one layer would carry NAL units belonging to that layer only. An RTP stream carrying a complete scalable video bit stream would carry NAL units of a base layer and one or more enhancement layers. SVC specifies the decoding order of these NAL units.

In some cases, data in an enhancement layer can be truncated after a certain location, or at arbitrary positions, where each truncation position may include additional data representing increasingly enhanced visual quality. In cases where the truncation points are closely spaced, the scalability is said to be "fine-grained," hence the term "fine grained (granular) scalability" (FGS). In contrast to FGS, the scalability provided by those enhancement layers that can only be truncated at certain coarse positions is referred to as "coarse-grained (granularity) scalability" (CGS).

According to the H.264/AVC video coding standard, an access unit comprises one primary coded picture. In some systems, detection of access unit boundaries can be simplified by inserting an access unit delimiter NAL unit into the bitstream. In SVC, an access unit may comprise multiple primary coded pictures, but at most one picture per each unique combination of dependency_id, temporal_level, and quality_level.

Coded video bitstream may include extra information to enhance the use of the video for a wide variety purposes. For example, supplemental enhancement information (SEI) and video usability information (VUI), as defined in H264/AVC, provide such a functionality. The H.264/AVC standard and its extensions include the support of SEI signaling through SEI messages. SEI messages are not required by the decoding process to generate correct sample values in output pictures. Rather, they are helpful for other purposes, e.g., error resilience and display. H.264/AVC contains the syntax and semantics for the specified SEI messages, but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow system specifications, such as 3GPP multimedia specifications and DVB specifications, to interpret the supplemental information identically and hence interoperate. It is intended that system specifications can require the use of particular SEI messages both in encoding end and in decoding end, and the process for handling SEI messages in the recipient may be specified for the application in a system specification.

SVC uses a similar mechanism as that used in H.264/AVC to provide hierarchical temporal scalability. In SVC, a certain set of reference and non-reference pictures can be dropped from a coded bitstream without affecting the decoding of the remaining bitstream. Hierarchical temporal scalability requires multiple reference pictures for motion compensation, i.e., there is a reference picture buffer containing multiple decoded pictures from which an encoder can select a reference picture for inter prediction. In H.264/AVC, a feature called sub-sequences enables hierarchical temporal scalability, where each enhancement layer contains sub-sequences and each sub-sequence contains a number of reference and/or non-reference pictures. The sub-sequence is also comprised of a number of inter-dependent pictures that can be disposed without any disturbance to any other sub-sequence in any lower sub-sequence layer. The sub-sequence layers are hierarchically arranged based on their dependency on each other. Therefore, when a sub-sequence in the highest enhancement layer is disposed, the remaining bitstream remains valid. In H.264/AVC, signaling of temporal scalability information is effectuated by using sub-sequence-related supplemental enhancement information (SEI) messages. In SVC, the temporal level hierarchy is indicated in the header of Network Abstraction Layer (NAL) units.

In addition, SVC uses an inter-layer prediction mechanism, whereby certain information can be predicted from layers other than a currently reconstructed layer or a next lower layer. Information that could be inter-layer predicted includes intra texture, motion and residual data. Inter-layer motion prediction also includes the prediction of block coding mode, header information, etc., where motion information from a lower layer may be used for predicting a higher layer. It is also possible to use intra coding in SVC, i.e., a prediction from surrounding macroblocks or from co-located macroblocks of lower layers. Such prediction techniques do not employ motion information and hence, are referred to as intra prediction techniques. Furthermore, residual data from lower layers can also be employed for predicting the current layer.

SVC, as described above, involves the encoding of a "base layer" with some minimal quality, as well as the encoding of enhancement information that increases the quality up to a maximum level. The base layer of SVC streams is typically advanced video coding (AVC)-compliant. In other words, AVC decoders can decode the base layer of an SVC stream and ignore SVC-specific data. This feature has been realized by specifying coded slice NAL unit types that are specific to SVC, were reserved for future use in AVC, and must be skipped according to the AVC specification.

An instantaneous decoding refresh (IDR) picture of H.264/AVC contains only intra-coded slices and causes all reference pictures except for the current picture to be marked as "unused for reference." A coded video sequence is defined as a sequence of consecutive access units in decoding order from an IDR access unit, inclusive, to the next IDR access unit, exclusive, or to the end of the bitstream, whichever appears earlier. A group of pictures (GOP) in H.264/AVC refers to a number of pictures that are contiguous in decoding order, starting with an intra coded picture, ending with the first picture (exclusive) of the next GOP or coded video sequence in decoding order. All of the pictures within the GOP following the intra picture in output order can be correctly decoded, regardless of whether any previous pictures were decoded. An open GOP is such a group of pictures in which pictures preceding the initial intra picture in output order may not be correctly decodable. An H.264/AVC decoder can recognize an intra picture starting an open GOP from the recovery point SEI message in the H.264/AVC bitstream. The picture starting an open GOP is referred to herein as an open decoding refresh (ODR) picture. A closed GOP is such a group of pictures in which all pictures can be correctly decoded. In H.264/AVC, a closed GOP starts from an IDR access unit.

Coded pictures can be represented by an index, $t10\_pic\_idx$. The index, $t10\_pic\_idx$, is indicative of NAL units in a SVC bitstream with the same value of dependency_id and quality_level in one access unit, where temporal_level is equal to zero. For an IDR picture with temporal_level equal to zero, the value of $t10\_pic\_idx$ is equal to zero or any value in the range of 0 to N−1, inclusive, where N is a positive integer. For any other picture with temporal_level equal to zero, the value of $t10\_pic\_idx$ is equal to $(t10\_pic\_idx\_0+1) \% N$, where $t10\_pic\_idx\_0$ is the value of $t10\_pic\_idx$ of a previous picture with temporal_level equal to 0, and % denotes a modulo operation. In the current SVC specification, $t10\_pic\_idx$ is included in the NAL unit header as a conditional field. A receiver or an MANE can examine the $t10\_pic\_idx$ values to determine whether it has received all the key pictures (i.e. pictures with temporal level equal to 0). In case a loss happens to a key picture, then a feedback may be sent to inform the encoder, which in turn may take some repair actions, e.g. retransmitting the lost key picture.

The RTP payload format for H.264/AVC is specified in Request for Comments (RFC) 3984 (available at www.rfc-editor.org/rfc/rfc3984.txt), and the draft RTP payload format for SVC is specified in the Internet Engineering Task Force (IETF) Internet-Draft draft-ietf-avt-rtp-svc-00 (available at tools.ietf.org/id/draft-ietf-avt-rtp-svc-00.txt).

RFC 3984 specifics several packetization modes, one of which is the interleaved mode. If the interleaved packetization mode is in use, then NAL units from more than one access units can be packetized into one RTP packets. RFC 3984 also specifies the concept of decoding order number (DON) that indicates the decoding orders of a NAL units conveyed in an RTP stream.

In the SVC RTP payload format draft, a new NAL unit type, referred to as payload content scalability information (PACSI) NAL unit, is specified. The PACSI NAL unit, if present, is the first NAL unit in an aggregation packet, and it is not present in other types of packets. The PACSI NAL unit indicates scalability characteristics that are common for all the remaining NAL units in the payload, thus making it easier for MANEs to decide whether to forward/process/discard the aggregation packet. Senders may create PACSI NAL units and receivers may ignore them, or use them as hints to enable efficient aggregation packet processing. When the first aggregation unit of an aggregation packet contains a PACSI NAL unit, there is at least one additional aggregation unit present in the same packet. The RTP header fields are set according to the remaining NAL units in the aggregation packet. When a PACSI NAL unit is included in a multi-time aggregation packet, the decoding order number for the PACSI NAL unit is set to indicate that the PACSI NAL unit is the first NAL unit in decoding order among the NAL units in the aggregation packet or the PACSI NAL unit has an identical decoding order number to the first NAL unit in decoding order among the remaining NAL units in the aggregation packet. The structure of PACSI NAL unit is the same as the four-byte SVC NAL unit header (where E is equal to 0), described below.

SUMMARY OF THE INVENTION

Various embodiments of the present invention provide a method of modifying error resiliency features by conveying temporal level 0 picture indices, such as t10_pic_idx, within an SEI message instead of optionally including them in the NAL unit header. In addition, a mechanism is provided for enabling repetition of any SEI messages in Real-Time Transport Protocol (RTP) packets. Enabling such repetition of any SEI messages facilitates detection of lost temporal level 0 pictures on the basis of any received packet.

Conveying the t10_pic_idx in SEI message results in as straightforward and robust loss detection as when the t10_pic_idx is conveyed in a NAL unit header. Furthermore, no changes in the NAL unit header or slice header are required, nor are the semantics of t10_pic_idx changed. In addition, implementing error resilience features, such as those described herein, do not affect the specified decoding process of H.264/AVC or its current extensions.

Various embodiments provide a method, computer program product and apparatus for packetizing an encoded bitstream representative of a video sequence, comprising packetizing at least a portion of the encoded video sequence into a first packet, wherein the first packet includes information summarizing contents of the at least a portion of the encoded video sequence, and providing in the first packet supplemental enhancement information associated with the at least a portion of the encoded video sequence. Embodiments also provide a method, computer program product and apparatus for depacketizing encoded video, comprising depacketizing at least a portion of an encoded video sequence from a first packet, wherein the first packet includes information summarizing contents of the at least a portion of the encoded video sequence. Additionally, supplemental enhancement information associated with the at least a portion of the encoded video sequence is obtained from the first packet.

Various embodiments provide a method, computer program product and apparatus for packetizing a temporal scalable bitstream representative of an image sequence, the method comprising packetizing at least a portion of the image sequence into a first packet, wherein the first packet comprises first information summarizing the contents of the at least a portion of the encoded image sequence, and providing in the first packet second information indicative of a decoding order of an image within a lowest temporal layer in a temporal layer hierarchy. Still further embodiments provide a method, computer program product and apparatus for depacketizing encoded video, comprising depacketizing from a first packet at least a portion of an encoded image sequence, wherein the first packet comprises first information summarizing the contents of the at least a portion of the encoded image sequence. Additionally, second information indicative of a decoding order of an image within a lowest temporal layer in a temporal layer hierarchy is obtained from the first packet.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
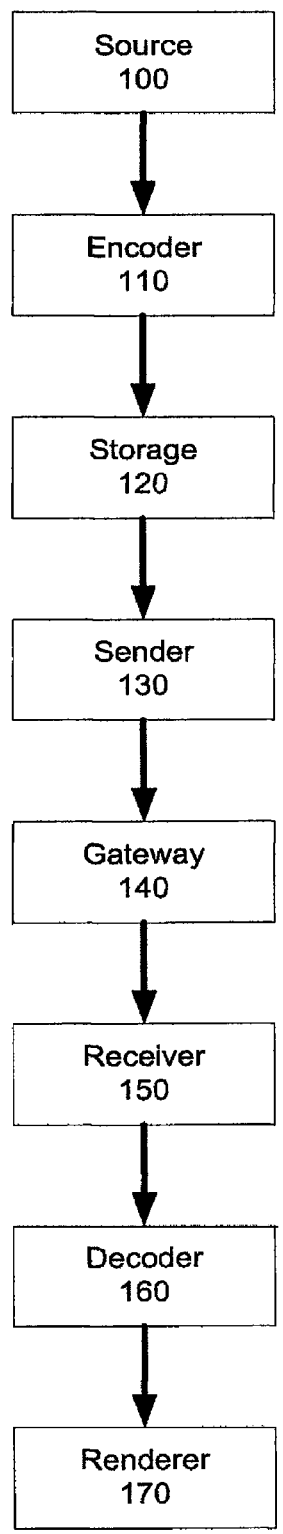
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to a sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and the sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to RTP, User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. Finally, a renderer 170 may reproduce the uncompressed media streams with a loudspeaker or a display, for example. The receiver 150, the decoder 160, and the renderer 170 may reside in the same physical device or they may be included in separate devices. It should be noted that the bitstream to be decoded can be received from a remote device located within virtually any type of network. Additionally, the bitstream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
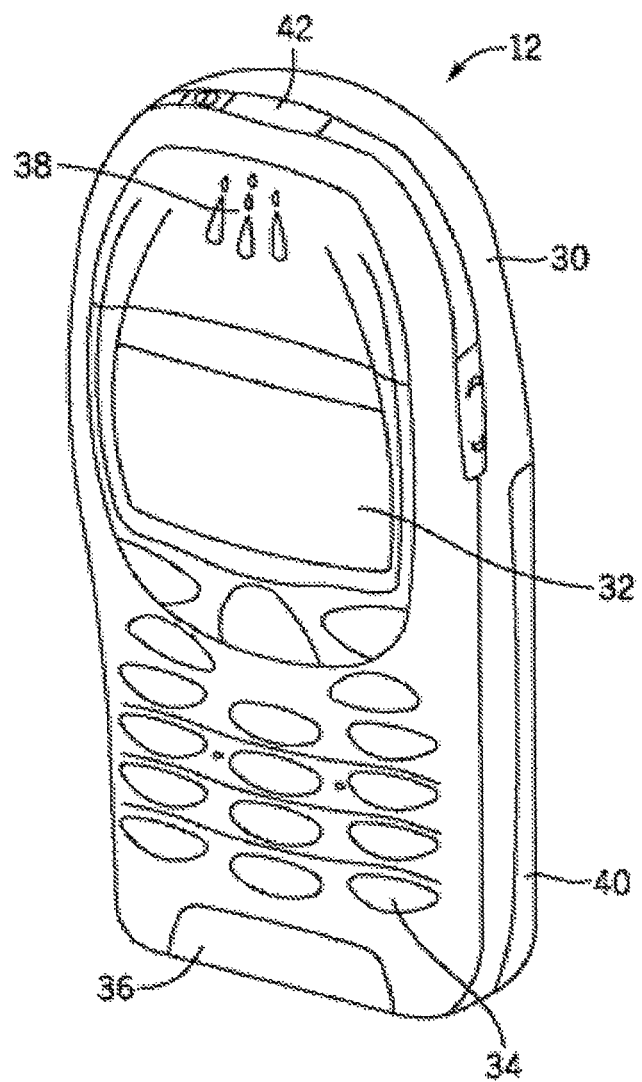
FIG. 2 is a perspective view of a mobile telephone that can be used in the implementation of the present invention.
Figure 3:
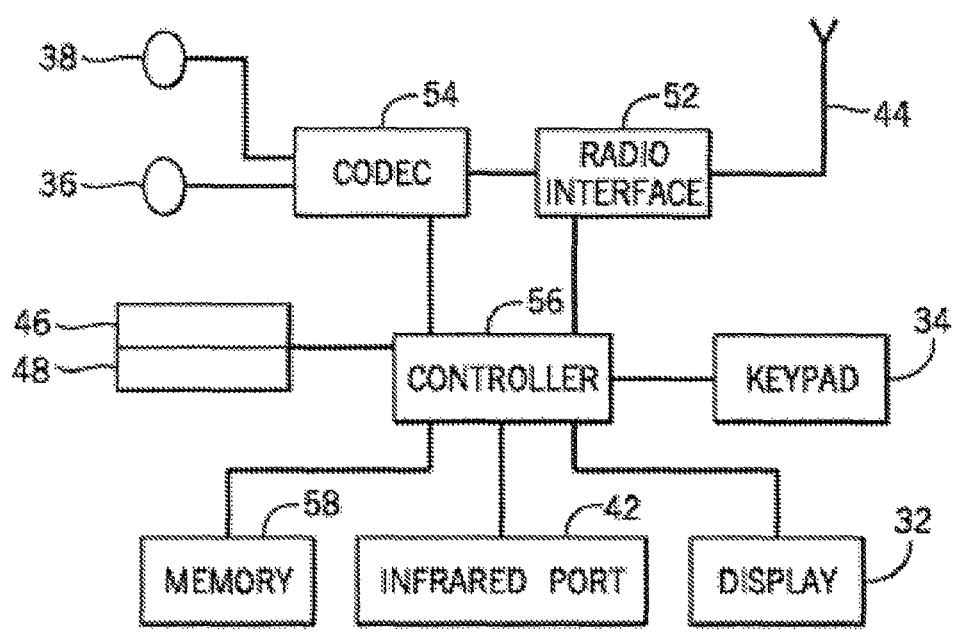
FIG. 3 is a schematic representation of the telephone circuitry of the mobile telephone of FIG. 2.

FIGS. 2 and 3 show one representative mobile device 12 within which the present invention may be implemented. It should be understood, however, that the present invention is not intended to be limited to one particular type of mobile device 12 or other electronic device. Some or all of the features depicted in FIGS. 2 and 3 could be incorporated into any or all of the devices represented in FIG. 1.

The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 4:
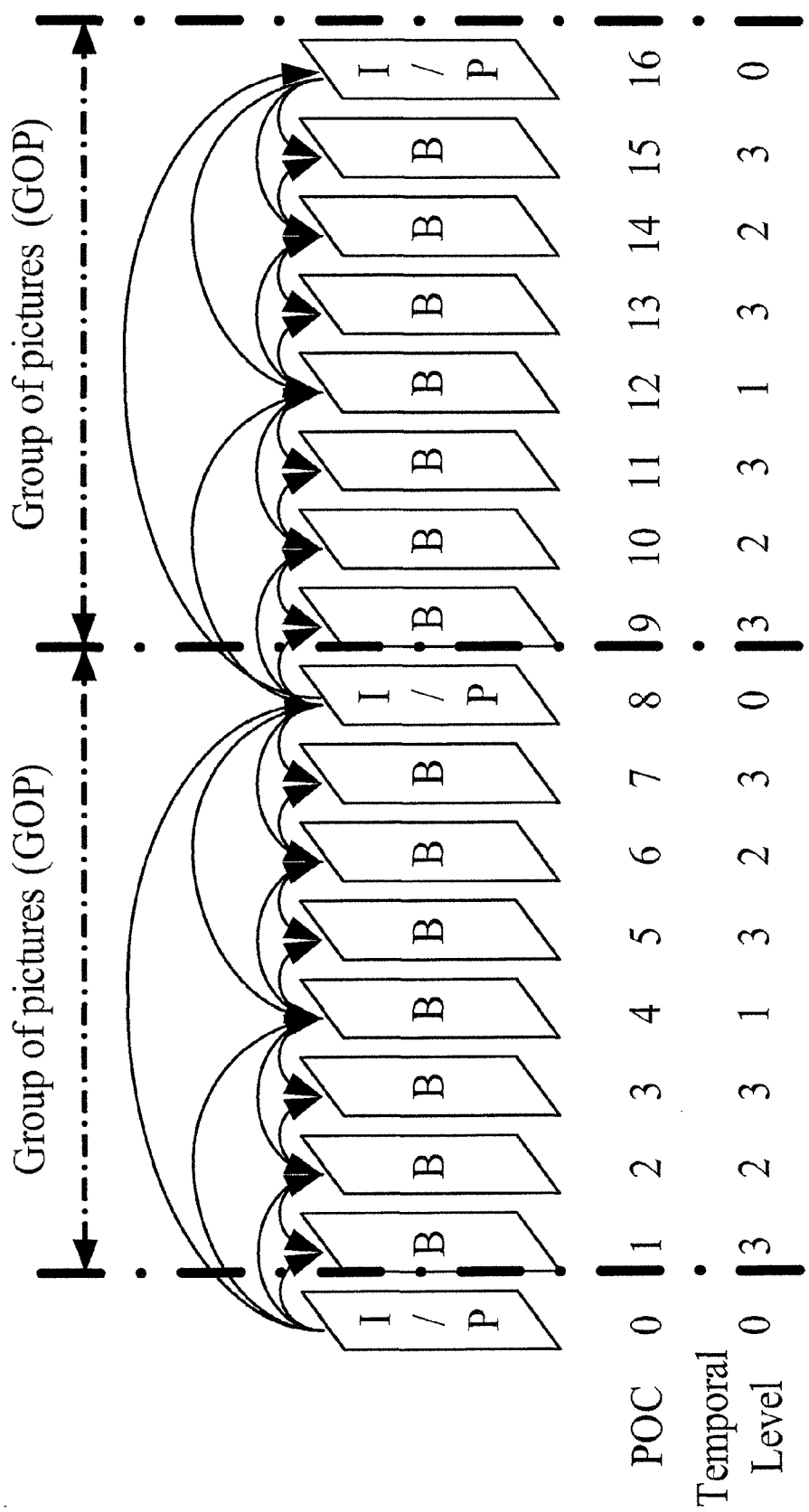
FIG. 4 is an illustration of an example temporal scalable bitstream.

FIG. 4 shows an example bitstream with four temporal layers as well as the values of t10_pic_idx for each picture. A temporal level equal to 0 is called the lowest temporal layer in the hierarchy of the layers. According to the semantics of t10_pic_idx, if the picture has temporal level equal to 0, then t10_pic_idx is the temporal-level-0 index of the picture itself. Therefore, the t10_pic_idx values for pictures with picture order count (POC) equal to 0, 8 and 16 are equal to 0, 1 and 2, respectively. If the picture has temporal level greater than 0, then t10_pic_idx is the temporal-level-0 index of the previous picture in decoding order with temporal level equal to 0. Therefore, the t10_pic_idx values for pictures with POC equal to 1 to 7 are all equal to 1, because for them the previous picture in decoding order with temporal level equal to 0 is the picture with POC equal to 8, and the t10_pic_idx values for pictures with POC equal to 9 to 15 are all equal to 2, because for them the previous picture in decoding order with temporal level equal to 0 is the picture with POC equal to 16.

The various embodiments of the present invention provide a method of modifying error resiliency features by conveying temporal level 0 picture indices, such as t10_pic_idx, within an SEI message instead of optionally including them in the NAL unit header. In addition, a mechanism is provided for enabling repetition of any SEI messages in Real-Time Transport Protocol (RTP) packets. Enabling such repetition of any SEI messages facilitates detection of lost temporal level 0 pictures on the basis of any received packet.

A field where the t10_pic_idx index is represented can be included in a new SEI message, which can be associated with each coded picture with temporal_level equal to zero or any value. The new SEI message can be referred to as a t10 picture index SEI message, for example, and can be specified as follows:

| t10_picture_index( payloadSize ) { | C | Descriptor |
|---|---|---|
|   t10_pic_idx | 5 | u(8) |
| } | | |

Conveying the t10_pic_idx in a new SEI message results in as straightforward and robust temporal level 0 picture loss detection as when the t10_pic_idx is conveyed in a NAL unit header. Furthermore, no changes in the NAL unit header or slice header are required, nor are the semantics of t10_pic_idx changed. In addition, implementing error resilience features, such as those described herein, do not affect the specified decoding process of H.264/AVC or its current extensions. In fact, error resilience features similar to t10_pic_idx, such as sub-sequence information SEI message which also includes a frame counter, have been previously included as SEI messages in contrast to high-level syntax structures, such as the NAL unit header and slice header. Hence, such a method of conveying temporal level 0 picture indices is commensurate with other, conventional error resilience features of H.264/AVC.

Furthermore, it is possible to modify a payload content scalability information (PACSI) NAL unit to include the new SEI message. Currently, the PACSI NAL unit, if present, is the first NAL unit in a packet, and contains an SVC NAL unit header summarizing the contents of the packet. The payload of the PACSI NAL unit is empty. The NAL unit type for the PACSI NAL unit is selected among those values that are unspecified in the SVC specification and in the H.264/AVC RTP payload specification, resulting in the PACSI NAL unit being ignored by H.264/AVC or SVC decoders and H.264/AVC RTP receivers.

Assuming SEI NAL units are allowed in the PACSI NAL unit payload, any SEI NAL unit in the PACSI NAL unit payload can be used to repeat a SEI NAL unit of the access unit of the first NAL unit following, but not nested in, the PACSI NAL unit. In addition, the PACSI NAL unit can include reference picture marking repetition SEI messages, as well as other NAL units that can appear before the first VCL NAL unit in an access unit. This enables detection of long-term picture index assignments of prior temporal level 0 pictures in decoding order. It should be noted that any additional bitrate overhead as a result of conveying the t10_pic_idx within the new SEI message is negligible.

When interleaved packetization mode is used, the PACSI NAL unit can only contain SEI messages for the first NAL unit of the RTP payload, as described above. However, according to another embodiment of the present invention, the PACSI NAL unit does not encapsulate the new SEI messages as such, but rather encapsulates pairs of SEI NAL units in addition to decoding order numbers (DONs) or DON differences, any other picture identifiers, or any other NAL unit identifiers within the RTP payload, such as NAL unit sequence numbers within the payload.

According to yet another embodiment of the present invention, a new type of NAL unit can be specified in the RTP payload specification, which can be referred to as interleaved PACSI (IPACSI). This NAL unit can be inserted before any AVC/SVC NAL unit in the RTP payload. In addition, the payload of IPACSI may contain a repetition of SEI NAL units for the access unit to which the AVC/SVC NAL unit belongs.

It should be noted that the various embodiments of the present invention do not associate dependency_id and/or quality_level with the t10_pic_idx SEI message, because the t10_pic_idx SEI message can be utilized within the scalable nesting SEI when dependency_id>0 or quality_level>0. Therefore, more than one use for the scalable nesting SEI is possible, although, parsing processes in a Media Aware Network Element (MANE) become marginally more complicated. Alternatively, a loop can be implemented in the t10_pic_index SEI message itself for different values of dependency_id and quality_level.

It should be noted that other problems besides that presented herein for t10_pic_index, exist. For example, when a temporal level 1 picture uses more than one temporal level 0 picture as a prediction reference, the t10_pic_index may not be a reliable indication that the temporal-level-1 picture can be decoded. Therefore, other approaches for resolving problems with the t10_pic_index can be taken. For example, usage of different long-term indices in consequent temporal-level-0 pictures make it less likely that a picture assigned a particular long-term index is incorrectly referred to. Additionally, reference pictures that are actually used, including those that are long-term, can be concluded based on the slice header when reference picture list reordering commands are used. Alternatively still, sub-sequence SEI messages can be utilized, where sub-sequence layer numbers and sub-sequence identifiers can be used intelligently to conclude in which sub-sequence layers losses have occurred. In some prediction structures, short-term reference pictures can be utilized instead of long-term reference pictures. In yet another alternative, a "transport" layer can be the basis for approaching the convention t10_pic_idx problem, e.g., usage of generic not acknowledged (NACK) packets of the RTP Audio-visual feedback (AVPF) profile, where the NACK packets can be transmitted whenever a potential loss of a temporal level 0 picture is detected.

The present invention is described in the general context of method steps, which may be implemented in one embodiment by a program product including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, computer program products and systems.

What is claimed is:

1. A method for packetizing a temporal scalable bitstream representative of an image sequence, the method comprising:
packetizing, by a processor, at least a portion of the image sequence into a first packet, wherein the first packet comprises first information summarizing the contents of the at least a portion of the encoded image sequence, and providing in the first packet second information indicative of a decoding order of an image within a lowest temporal layer in a temporal layer hierarchy.

2. The method of claim 1, wherein the second information comprises a temporal level picture index.

3. The method of claim 2, wherein the temporal level picture index comprises a plurality of network abstraction layer units in a scalable video coding bitstream.

4. The method of claim 2, wherein, if the image represents an instantaneous decoding refresh picture, the value of the temporal level picture index is equal to one of a zero value and any other value in a predetermined range.

5. The method of claim 2, wherein, if the image does not represent an instantaneous decoding refresh picture, the value of the temporal level picture index is a function of a modulo-operated value of a temporal level picture index of a previous picture having a temporal level of zero.

6. A computer program product, embodied in a non-transitory computer-readable medium, comprising computer code configured to perform the processes of claim 1.

7. An apparatus, comprising:
a processor; and
a memory unit communicatively connected to the processor and including:
computer code for packetizing at least a portion of an image sequence into a first packet, wherein the first packet comprises first information summarizing the contents of the at least a portion of the encoded image sequence, and computer code for providing in the first packet second information indicative of a decoding order of an image within a lowest temporal layer in a temporal layer hierarchy.

8. The apparatus of claim 7, wherein the second information comprises a temporal level picture index.

9. The apparatus of claim 8, wherein the temporal level picture index comprises a plurality of network abstraction layer units in a scalable video coding bitstream.

10. The apparatus of claim 8, wherein, if the image represents an instantaneous decoding refresh picture, the value of the temporal level picture index is equal to one of a zero value and any other value in a predetermined range.

11. The apparatus of claim 8, wherein, if the image does not represent an instantaneous decoding refresh picture, the value of the temporal level picture index is a function of a modulo-operated value of a temporal level picture index of a previous picture having a temporal level of zero.

12. A method for depacketizing encoded video, comprising:

depacketizing, by a processor, from a first packet at least a portion of an encoded image sequence, wherein the first packet comprises first information summarizing the contents of the at least a portion of the encoded image sequence, and obtaining from the first packet second information indicative of a decoding order of an image within a lowest temporal layer in a temporal layer hierarchy.

13. The method of claim 12, wherein the second information comprises a temporal level picture index.

14. The method of claim 13, wherein the temporal level picture index comprises a plurality of network abstraction layer units in a scalable video coding bitstream.

15. The method of claim 13, wherein, if the image represents an instantaneous decoding refresh picture, the value of the temporal level picture index is equal to one of a zero value and any other value in a predetermined range.

16. The method of claim 13, wherein, if the image does not represent an instantaneous decoding refresh picture, the value of the temporal level picture index is a function of a modulo-operated value of a temporal level picture index of a previous picture having a temporal level of zero.

17. A computer program product, embodied in a non-transitory computer-readable medium, comprising computer code configured to perform the processes of claim 12.

18. An apparatus, comprising:

a processor; and a memory unit operatively connected to the processor and including:

computer code for depacketizing from a first packet at least a portion of an encoded image sequence, wherein the first packet comprises first information summarizing the contents of the at least a portion of the encoded image sequence, and computer code for obtaining from the first packet second information indicative of a decoding order of an image within a lowest temporal layer in a temporal layer hierarchy.

19. The apparatus of claim 18, wherein the second information comprises a temporal level picture index.

20. The apparatus of claim 19, wherein the temporal level picture index comprises a plurality of network abstraction layer units in a scalable video coding bitstream.

21. The apparatus of claim 19, wherein, if the image represents an instantaneous decoding refresh picture, the value of the temporal level picture index is equal to one of a zero value and any other value in a predetermined range.

22. The apparatus of claim 19, wherein, if the coded picture does not represent an instantaneous decoding refresh picture, the value of the temporal level picture index is a function of a modulo-operated value of a temporal level picture index of a previous picture having a temporal level of zero.

* * * * *